United States Patent [19]
Dal Palú

[11] Patent Number: 5,413,386
[45] Date of Patent: May 9, 1995

[54] VEHICLE PIPE-CONTAINER COUPLING ASSEMBLY

[75] Inventor: Attilio Palú, Rivoli, Italy

[73] Assignee: Fabbrica Italiana Serrature Torino, S.p.A., Torino, Italy

[21] Appl. No.: 40,421

[22] Filed: Mar. 31, 1993

[30] Foreign Application Priority Data

Mar. 31, 1992 [IT] Italy ............................ TO92A0290

[51] Int. Cl.6 .................................................. F16L 3/04
[52] U.S. Cl. ................................. 285/158; 285/319; 285/360; 285/921
[58] Field of Search ............... 285/319, 360, 158, 331, 285/921

[56] References Cited

U.S. PATENT DOCUMENTS

| 2,710,202 | 6/1955 | Bronx | 285/30 |
|---|---|---|---|
| 3,531,142 | 9/1970 | Peasley | 285/39 |
| 3,986,734 | 10/1976 | Davis | 285/158 |
| 4,679,827 | 7/1987 | Law | 285/158 |
| 4,927,188 | 5/1990 | Sands | 285/158 X |
| 4,929,002 | 5/1990 | Sauer | 285/331 X |
| 4,959,506 | 9/1990 | Petty et al. | 285/158 X |
| 5,228,724 | 7/1993 | Godeau | 285/921 X |

FOREIGN PATENT DOCUMENTS 2244774A 12/1991 United Kingdom .

Primary Examiner—Dave W. Arola
Attorney, Agent, or Firm—Kinney & Lange

[57] ABSTRACT

A coupling assembly comprising a fitting body designed to fit on to a pipe and on to a container, typically a vehicle tank, via an intermediate element designed to click on to the fitting body and connectable to the container, for example, via a screw connection.

9 Claims, 3 Drawing Sheets

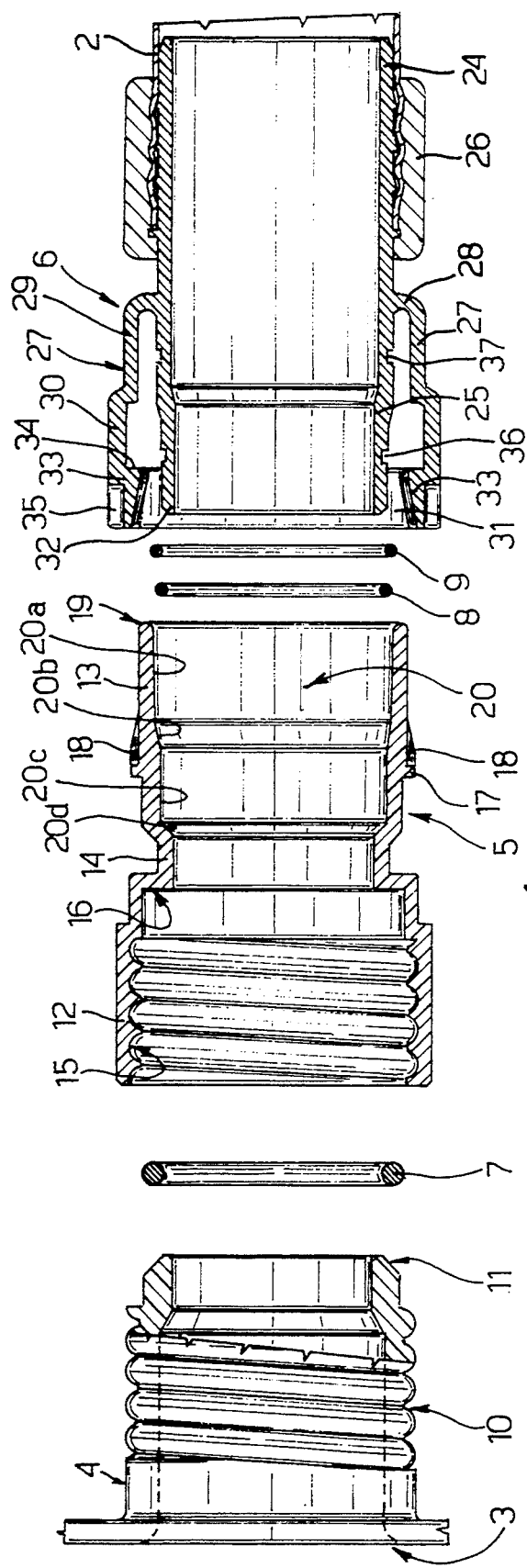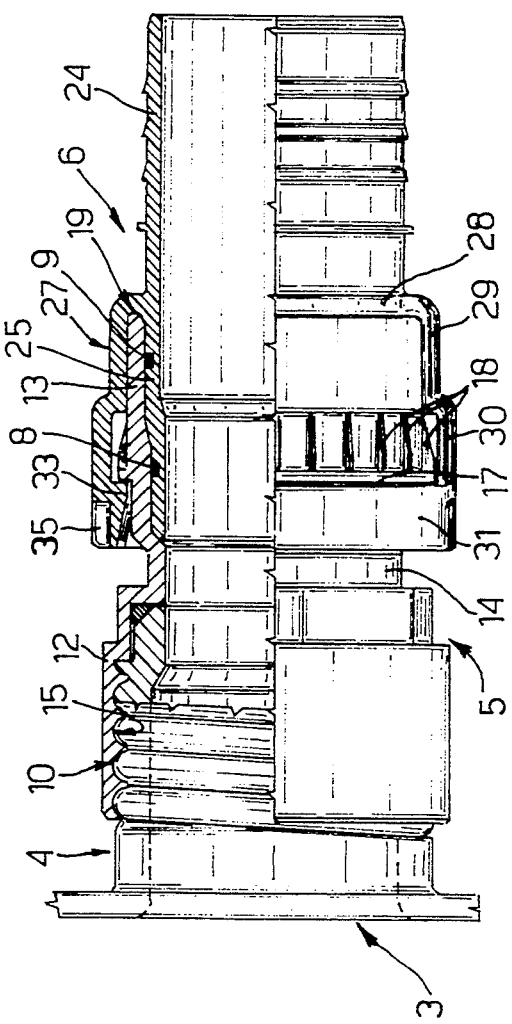

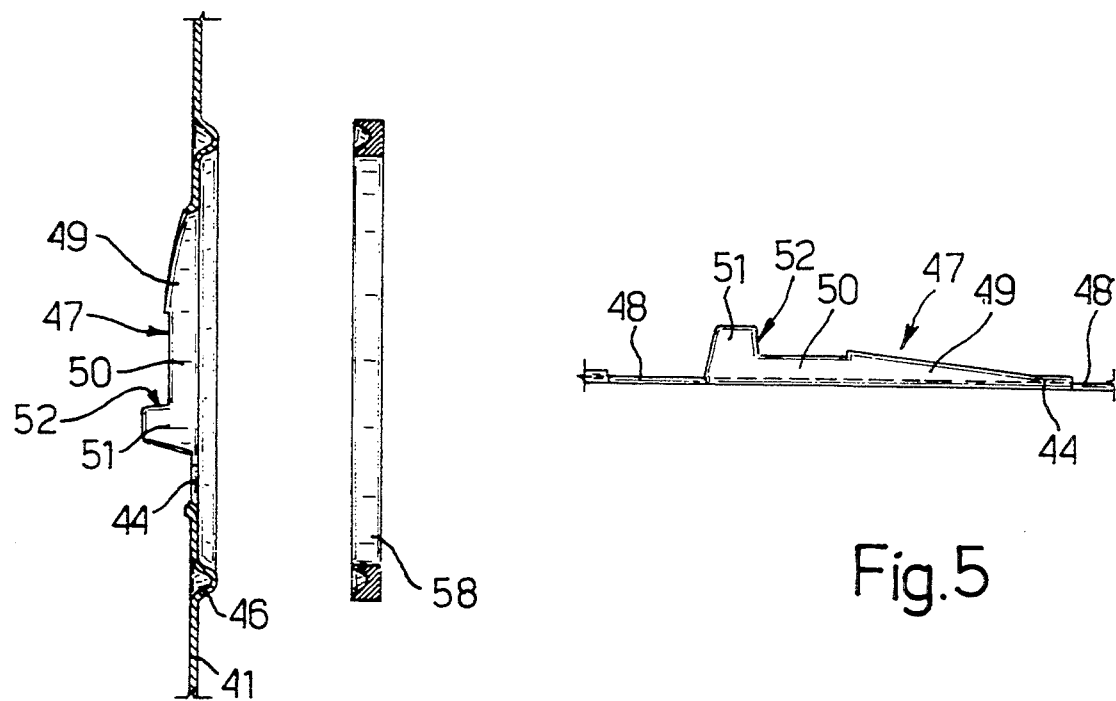
Fig. 4
Fig. 5
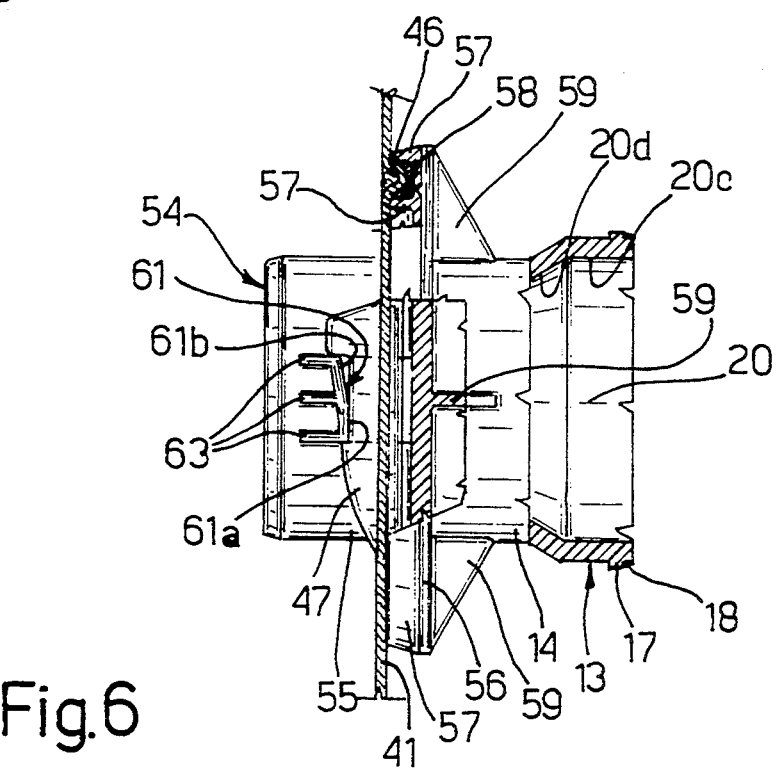
Fig. 6

VEHICLE PIPE-CONTAINER COUPLING ASSEMBLY

BACKGROUND OF THE INVENTION

The present invention relates to a vehicle pipe-container coupling assembly, particularly for connecting the fuel supply pipe to the tank, but which is also suitable for use on the engine cooling liquid circuit.

At present, the pipe connecting the fuel tank of motor vehicles to the filler is fitted to the tank using metal clamps, which grip the pipe about a projecting portion at the inlet of the tank, normally via the interposition of rubber seals for preventing fuel leakage, and are tightened using screws or metal rivets.

Such a system presents several drawbacks. Firstly, it requires a certain amount of skill on the part of the fitter, for ensuring correct assembly, and, particularly in the case of replacements, problems are invariably encountered due to limited access to the on-vehicle parts. Secondly, care must be taken to ensure correct sealing, which, in view of the above difficulties, is not always satisfactory. Thirdly, known fasteners of the aforementioned type tend to deteriorate rapidly, due to oxidation and rapid wear of the metal and rubber parts respectively, thus resulting in impaired sealing performance, as well as in removal problems, particularly in view of the limited access available, as mentioned previously.

Fast-fit plastic couplings are becoming extremely popular as a means of enabling troublefree connection of pipes or tubular elements. Known fast-fit couplings, however, are unsuitable for direct connection of the fuel supply pipe to the tank, which would involve complex, high-cost work on the tank for forming the connecting parts, and with no guarantee of effective sealing or long life of the connection, regardless of whether the tank is made of metal sheet or plastic, which is normally too soft.

SUMMARY OF THE INVENTION

It is an object of the present invention to provide a fast-fit coupling designed to overcome the aforementioned drawback.

According to the present invention, there is provided a coupling assembly comprising a fitting body connectable to a tubular body and to a container; characterized by the fact that it comprises an intermediate element designed to click on to said fitting body and securable to said container.

BRIEF DESCRIPTION OF THE DRAWINGS

Two preferred non-limiting embodiments of the present invention will be described by way of example with reference to the accompanying drawings, in which:

FIG. 1 shows an exploded longitudinal section of a first embodiment of the coupling according to the present invention;

FIG. 2 shows a partial longitudinal section and partial side view of the FIG. 1 coupling as connected;

FIG. 4 shows a side view of a detail in FIG. 3;

FIG. 5 shows a partial spreadout view of the FIG. 4 detail;

FIG. 6 shows a partially brokendown side view of part of the FIG. 3 coupling as connected.

DETAILED DESCRIPTION OF THE INVENTION

Figure 3:
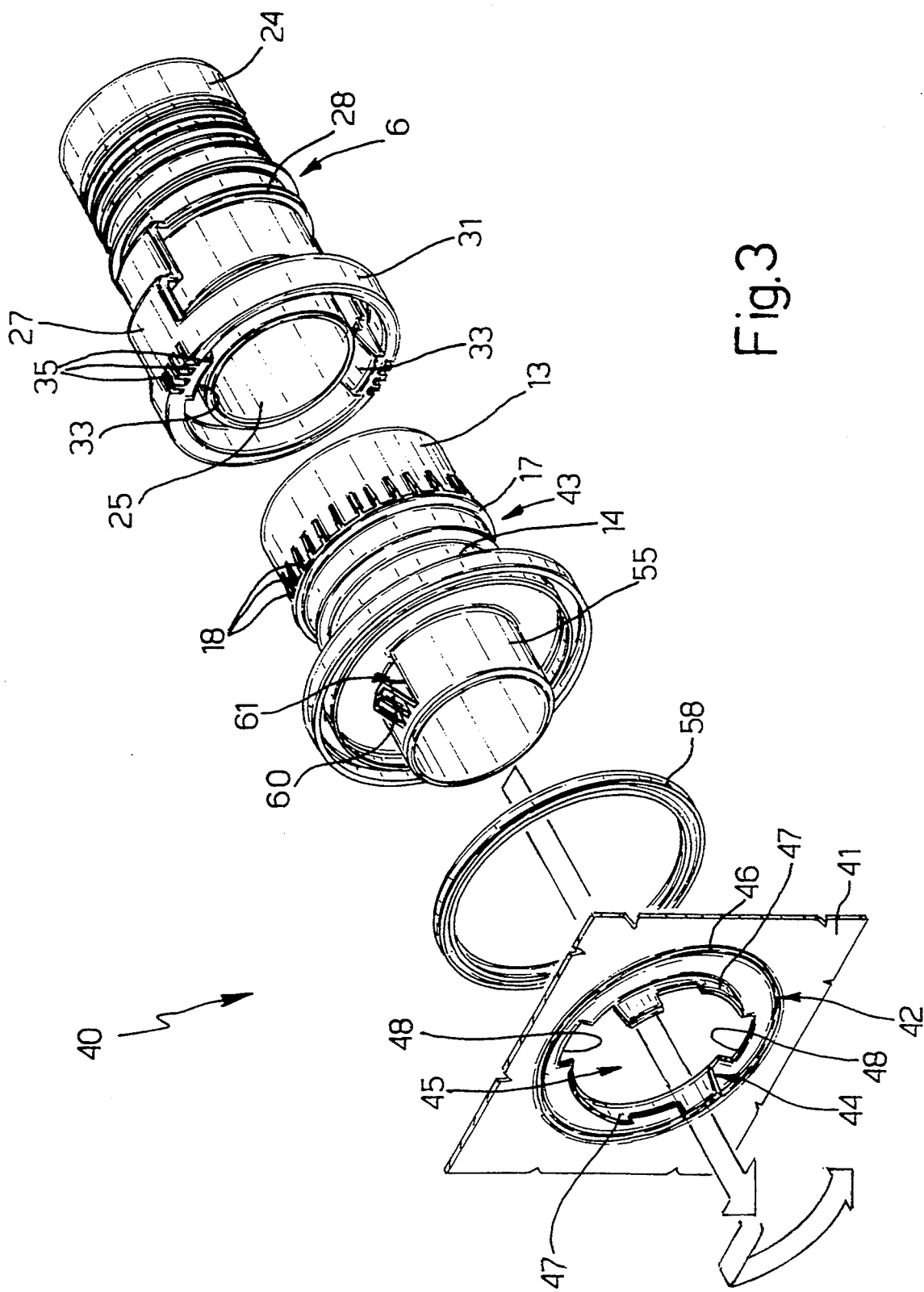
FIG. 3 shows an exploded view in perspective of a second embodiment of the coupling according to the present invention.

Number 1 in FIG. 1 indicates a coupling assembly for connecting a fuel supply pipe 2 to a tank 3 made of plastic material, typically high-density polythene or similar. Assembly 1 comprises a fitting portion 4 formed on tank 3; an intermediate element 5 which is screwed to fitting portion 4; and a fitting body 6 supported on pipe 2 and designed to click on to intermediate element 5. An elastic ring 7 is inserted between fitting portion 4 and intermediate element 5, and two elastic rings 8 and 9 are inserted between intermediate element 5 and fitting body 6. Intermediate element 5 and fitting body 6 are conveniently made of plastic material, preferably polyamide.

In particular, tubular fitting portion 4 extends from tank 3, and presents an external thread 10 and a bevel 11 on the end portion for assisting insertion inside intermediate element 5.

Fitting portion 4, together with thread 10, is blow molded together with tank 3, then the end of portion 4 is cut and worked to form bevel 11.

Intermediate element 5 is substantially tubular, and comprises a first portion 12, a second portion 13 and an-intermediate portion 14. First portion 12 houses a nut screw 15 for engaging thread 10, and intermediate portion 14 presents an inner shoulder 16 for seating elastic ring 7. Second portion 13 of intermediate element 5 is smaller in diameter than first portion 12, and presents an outer annular flange 17 from one side of which extend trapezoidal strengthening ribs 18 equally spaced about the entire circumference of second portion 13 (FIG. 2). Second portion 13 also presents a rounded edge 19, and an inner cavity 20 comprising, as of edge 19, a first portion 20a decreasing slightly in diameter; a second portion 20b decreasing sharply in diameter; a third constant-diameter portion 20c; and a fourth portion 20d decreasing sharply in diameter and blending with intermediate portion 14.

Fitting body 6 presents a tubular rear portion 24 having an outside diameter equal to the inside diameter of pipe 2; and a tubular front portion 25 integral with rear portion 24 and the outer contour of which substantially coincides with that of cavity 20 of second portion 13 of intermediate element 5. Tubular rear portion 24 is partially inserted inside an end portion of pipe 2 to which it is secured integrally by means of sleeve 26.

Fitting body 6 also presents two elastic diametrically-opposed appendixes 27 extending from an outer annular portion 28 in turn extending from an intermediate point between tubular portions 24 and 25. Appendixes 27 present a first portion 29 parallel to fitting body 6, a second more radially-outer portion 30 also parallel to fitting body 6, and an annular end body 31 separated annularly from the front end edge 32 of tubular front portion 25. The inside diameter of annular body 31 is larger than the outside diameter of annular flange 17.

At appendixes 27, annular body 31 presents two substantially trapezoidal projections 33, the longer parallel side of which defines a respective wall 34 designed to mate with annular flange 17, as described later on, for clicking fitting body 6 on to intermediate element 5. The minimum diametrical distance between projections 33 is less than the outside diameter of annular flange 17. At projections 33, the outer surface of annular body 31 presents openings 35 (FIG. 3) for improving the elasticity and assisting deformation of annular body 31 when connecting and disconnecting intermediate element 5 and fitting body 6.

The outer surface of front tubular portion 25 of fitting body 6 presents two annular rectangular-section grooves 36, 37 for respectively seating elastic rings 8 and 9.

Pipe 2, already co-molded on to fitting body 6, is connected to tank 3 by first screwing and tightening intermediate element 5 integral with fitting portion 4, after first inserting ring 7. If necessary, adhesive may be used between portion 4 and element 5. Body 6 is then fitted on to intermediate element 5 by inserting second portion 13 of element 5 between tubular front portion 25 and annular body 31 of body 6. During insertion, annular body 31 is deformed elastically and widened at projections 33, so as to enable annular flange 17 to slide past projections 33 and click behind wall 34 into the position shown in FIG. 2.

Intermediate element 5 and fitting body 6 are thus connected stably, with tubular front portion 25 fitted firmly inside inner cavity 20. Moreover, the wall of second portion 13 of intermediate element 5 is held firmly against front portion 25 of body 6 by portions 29, and compresses elastic rings 8 and 9, so as to ensure effective sealing between intermediate element 5 and fitting body 6. Sealing between element 5 and portion 4 is assured by elastic ring 7, which is compressed between beveled edge 11 of portion 4 and shoulder 16 of intermediate element 5.

Body 6 may be disconnected from element 5 as proposed for similar fast-fit couplings, by deforming annular body 31, e.g. using a tool insertable between second portion 13 of element 5 and second portions 30 of appendixes 27, so as to detach projections 33 from annular flange 17, and by withdrawing body 6 from intermediate element 5.

FIGS. 3–6 show a second embodiment 40 of the coupling assembly, which may be used to advantage on sheet metal tanks. Any parts similar to those described with reference to FIGS. 1 and 2 are indicated using the same numbering system.

As shown, the tank 41 presents a fitting portion 42, shaped as described below, for the bayonet connection of an intermediate element 43 designed to click on to a fitting body 6 identical to the one already described.

Fitting portion 42 is formed by appropriately cutting and bending edge 44 of inlet 45 of tank 41, and provision is made around the whole of inlet 45 for an annular corrugation 46 facing outwards of the tank (i.e. towards intermediate element 43 after connection). As shown in FIG. 3, edge 44 defines two portions 47 bent inwards of tank 41 and separated by two openings 48 formed on the edge of inlet 45. As shown in detail in FIG. 5, which shows a spreadout view of half of edge 44, each portion 47 comprises a lead-in portion 49 sloping upwards (in a direction parallel to the axis of inlet 45 and commencing from the edge of the inlet); a sunken portion 50 of constant height and slightly lower than the maximum height of lead-in portion 49; and a stop portion 51 of maximum height, defining a stop face 52 substantially perpendicular to sunken portion 50.

Intermediate element 43 again comprises two portions for connection to tank 41 and fitting body 6 respectively; and an intermediate portion. In the FIGS. 3–6 embodiment, the portion connected to fitting body 6 is identical to portion 13 in FIGS. 1 and 2 and is therefore indicated by the same reference number, whereas the portion connected to tank 41 varies and is therefore indicated in FIGS. 3 and 6 by 55. In this case also, the intermediate portion is numbered 14.

Portion 55 is substantially tubular, and presents, on the outer surface, an annular lock flange 56 located a given distance from the free end 54 of portion 55. On the side facing end 54, flange 56 presents a pair of concentric annular projections 57 defining, together with flange 56, a C section facing and, in use, surrounding corrugation 46. Between projections 57, there is inserted an elastic ring 58 (FIG. 4) having a substantially rectangular cross section with one concave side (for engaging corrugation 46). On the opposite side of flange 56, facing portion 13 of intermediate element 43, provision is made for strengthening ribs 59.

Between end 54 and flange 56, portion 55 presents two diametrically-opposed radial projections 60, the outer profile of which, in the direction of the circumference of portion 55, substantially corresponds with that of openings 48. Each projection 60 defines an engaging surface 61 facing portion 13 of intermediate element 43 and formed by a portion 61a substantially parallel to flange 56, and a lead-in portion 61b sloping slightly from portion 61a towards end 54. The circumferential width of engaging surface 61 is roughly equal to that of sunken portion 50, for enabling its insertion as explained later on. Projections 60 are. reinforced by means of longitudinal strengthening ribs 63 extending from projections 60 towards end 54 of intermediate element 43.

As already stated, portion 13 of intermediate element 43 is identical to that described with reference to FIGS. 1 and 2, for enabling connection to fitting body 6, which is thus common to both embodiments.

To connect tank 41 and body 6, secured to a pipe not shown in FIGS. 3–6, intermediate element 43 is first fitted to portion 42 of the tank by inserting portion 55 of element 43 inside tank 41, through inlet 45, with projections 60 aligned with openings 48 and after first inserting elastic ring 58 between annular projections 57. Once projections 60 are fitted through openings 48, intermediate element 43 is rotated in the direction indicated by the arrow in FIG. 3, so that each lead-in surface 61b of projections 60 engages a respective lead-in portion 49 of bent portions 47, and projections 60 click inside sunken portions 50, as shown in FIG. 6, thus locking intermediate element 43 in relation to tank 41.

Fitting body 6, integral with pipe 2, is then connected to portion 13 of intermediate element 43 as already described.

On coupling assembly 40, sealing between intermediate element 43 and tank 41 is assured by elastic ring 58 compressed between the wall of tank 41 and flange 56.

Intermediate element 43 is disconnected from fitting portion 42 by simply pushing element 43 against tank 41 so as to further compress elastic ring 58; rotating element 43 in the opposite direction to the arrow in FIG. 3 so as to release projections 60 from sunken portion 50 and align them with openings 48; and then simply withdrawing element 43.

The advantages of the coupling assemblies according to the present invention will be clear from the foregoing description. In particular, they provide for eliminating additional fastening elements, such as clamps, screws or rivets, which fail to provide for effective sealing under medium-high pressure conditions and, at any rate, are invariably subject to deterioration, thus resulting in leakage.

Both the embodiments described provide for fast, troublefree assembly with no need for special tools, thus ensuring reliable connection and optimum sealing, even in the case of parts affording only limited access.

The parts themselves involve no complex, high-cost operations, so that the assembly as a whole is cheap to produce, assemble and replace.

In the case of plastic tanks, the fitting portion on the tank, as already stated, is formed during molding of the tank and finished by means of a straightforward follow-up operation. This solution enables the same material to be used for the two click-on parts, i.e. the intermediate element and fitting body, which material may thus be selected according to the connection function and regardless of the material of the tank, which is normally too soft to ensure effective sealing. What is more, it provides for eliminating hot blade, ultrasonic or vibration welding operations, which, apart from the high cost involved, cannot be applied to the types of plastic currently used for manufacturing the tank.

In the case of sheet metal tanks, the bayonet connection solution between the tank and the intermediate element provides for effective sealing while at the same time enabling the two click-on parts to be made of suitable plastic material, as in the case of plastic tanks. What is more, fitting portion 42 on the tank may be formed easily and cheaply using proven techniques and machinery and with no need for welding.

The coupling assembly described also enables pretesting of the components, particularly the intermediate element and fitting body, for detecting any sealing defects prior to installation.

Using a common fitting body 6 for both assembly 1 on the plastic tank and assembly 40 on the sheet metal tank provides for reducing the number of different parts to be manufactured and stored what is more, body 6 may be fitted to pipe 2 beforehand, regardless of the type of tank to which pipe 2 is to be fitted.

To those skilled in the art it will be clear that changes may be made to the coupling assembly as described and illustrated herein without, however, departing from the scope of the present invention. For example, changes may be made to the design of the click-on elements, or to the type of connection between the intermediate element and the tank.

I claim:

1. A coupling assembly for coupling a tubular body to a container, the coupling assembly comprising:
    an intermediate element having a first end and a second end, the first end of the intermediate element being removably fastenable to the container, the intermediate element being substantialy tubular and having a first portion adjacent the first end and a second portion adjacent the second end, the second portion of the intermediate member having at least one retaining projection;
    a fitting body circumferentially fitted about the tubular body, the fitting body having first and second ends wherein the second end of the fitting body has receiving means for receiving that at least one retaining projection of the intermediate element; and
    wherein the container has a fitting portion projecting therefrom and wherein the first portion of the intermediate element is of a size to securely fit around the fitting portion projecting from the container.

2. An assembly as claimed in claim 1 wherein the fitting portion of the container is a tubular projection having a molded outer thread and wherein the first portion of the intermediate element contains internal threads for engaging the thread on the fitting portion of the container for securing the intermediate element to the container.

3. A coupling assembly for coupling a tubular body to a container, the coupling assembly comprising:
    an intermediate element having a first end and a second end, the first end of the intermediate element being removably fastenable to the container, the intermediate element being substantially tubular and having a first portion adjacent the first end and a second portion adjacent the second end, the second portion of the intermediate member having at least one retaining projection;
    a fitting body circumferentially fitted about the tubular body, the fitting body having first and second ends wherein the second end of the fitting body has receiving means for receiving the at least one retaining projection of the intermediate element; and
    wherein the container is made of sheet metal and has an inlet, and a retaining lip portion projecting from an edge of the inlet in a direction parallel to an axis of the inlet to the container, and wherein the first portion of the intermediate element has at least one lateral retaining projection engaging the retaining lip portion of the container when inserted therein.

4. An assembly as claimed in claim 3, wherein the retaining portion of the container includes an edge forming the inlet thereof and the edge having an opening therein to permit passage of the lateral retaining projection at least one opening of substantially the same width as the at least one lateral retaining lip projection of the intermediate clement, the retaining portion further including a lead in portion perpendicular to the edge and sloping inwardly in a direction parallel the axis of the inlet, a sunken portion of constant height, and a stop portion of maximum height defining a stop face substantially perpendicular to the sunken portion for engaging and stopping the at least one lateral retaining projection.

5. An assembly as claimed in claim 3 further comprising an elastic sealing means between the intermediate element and the container for sealing the intermediate element to the container.

6. An assembly as claimed in claim 3 wherein the second portion of the intermediate element has a pair of diametrically opposed laterally projecting retaining lip projections.

7. An assembly as claimed in claim 6 wherein the retaining lip projects inwardly towards an interior of the container, the lip having a pair of gradually increasing width portions, and wherein a notch is taken from each of the, increasing width portions of the lip to form a pair of retaining recesses, the retaining recesses being substantially the same width as the retaining lip projections of the intermediate element such that the respective retaining lip projections are retained in the respective retaining recesses.

8. An assembly as claimed in claim 6 wherein each of the retaining projections define a surface for engaging the container retaining lip portion wherein the engaging surface faces the second end of the intermediate clement and wherein the engaging surface comprises an engaging portion substantially perpendicular to the intermediate clement and a sloping leading edge portion.

9. An assembly as claimed in claim 6 wherein the first portion of the intermediate element has an annular flange located between the pair of retaining projections and the second portion of the intermediate element, the annular flange contains a pair of annular projections facing the pair of retaining projections for housing an elastic ring for sealing the intermediate element with the container, the annular flange being forced into contact with the container when the retaining projections engage the container retaining lip.

* * * * *